United States Patent [19]
Ishiyama

[11] Patent Number: 5,172,884
[45] Date of Patent: Dec. 22, 1992

[54] MOTOR-DRIVEN FOLDABLE TYPE DOOR MIRROR

[75] Inventor: Yoshihiko Ishiyama, Isehara, Japan

[73] Assignee: Ichikoh Industries, Ltd., Tokyo, Japan

[21] Appl. No.: 674,337

[22] PCT Filed: Aug. 30, 1990

[86] PCT No.: PCT/JP90/01103

§ 371 Date: Apr. 23, 1991

§ 102(e) Date: Apr. 23, 1991

[87] PCT Pub. No.: WO91/03337

PCT Pub. Date: Mar. 21, 1991

[30] Foreign Application Priority Data

Aug. 31, 1989 [JP] Japan .................. 1-101150[U]
Aug. 31, 1989 [JP] Japan .................. 1-101151[U]
Aug. 31, 1989 [JP] Japan .................. 1-101152[U]
Aug. 31, 1989 [JP] Japan .................. 1-101153[U]

[51] Int. Cl.⁵ .................................................. B60R 1/06
[52] U.S. Cl. ...................................... 248/479; 74/89.14
[58] Field of Search .................. 248/479, 485, 487; 359/877, 841; 74/89.14

[56] References Cited
U.S. PATENT DOCUMENTS 2,219,367 10/1940 Hagstrom .................. 74/89.14
4,798,967 1/1989 Yamana et al. ............ 248/479
4,987,791 1/1991 Nakahashi et al. ......... 748/89.1 X

FOREIGN PATENT DOCUMENTS 56-87651 7/1981 Japan .
62-50249 3/1987 Japan .

Primary Examiner—Alvin C. Chin-Shue
Attorney, Agent, or Firm—Foley & Lardner

[57] ABSTRACT

In a motor-driven foldable type door mirror using two stages of worm gears as reduction gear mechanism, an idle gear is interposed between a gear at a reduction gear and a gear of a clutch mechanism to provide a larger reduction ratio and for no interference of the second-stage worm gear with the assembling of the clutch mechanism. Also, to minimize the abrasion, caused by a thrust load developed at the second-stage worm, of both ends of the rotating shaft of the second-stage worm as well as of the thrust bearings which bear both the ends of the rotating shaft, balls for the thrust bearings are interposed between both the ends of the second-stage worm and the thrust bearings.

7 Claims, 5 Drawing Sheets

MOTOR-DRIVEN FOLDABLE TYPE DOOR MIRROR

FIELD OF THE INVENTION

The present invention relates to a motor-driven foldable type door mirror used as mounted on the door of a car, and more particularly to a motor-driven foldable type door mirror of a compact design and a large reduction ratio

BACKGROUND OF THE INVENTION

Generally, the motor-driven foldable type door mirror comprises a mirror base fixed to the door of a car, a shaft integrally formed on and extending from the mirror base, a mirror assembly pivotably supported on the shaft, a motor installed in the mirror assembly, and a reduction gear mechanism and clutch mechanism disposed between the motor and shaft. When the motor is put into operation, the mirror assembly is pivoted in relation to the mirror base from the normal to folded position or vice versa.

In such motor-driven foldable type door mirror, it is important to set an appropriate value of the output torque, namely, the reduction ratio of the reduction gear mechanism, for a smooth pivoting of the mirror assembly between the normal and folded positions. Also it is essential to design a compact drive and speed reduction mechanisms in the mirror assembly.

One of the motor-driven foldable type door mirrors having a compact structure and a large reduction ratio is known from the Japanese Unexamined Patent Publication No. Sho 62-50249 (laid open on Mar. 4, 1987).

This motor-driven foldable type door mirror comprises a reduction gear mechanism having two sets of a worm and worm wheel, which provides for a compact design and a large reduction ratio.

The present invention has an object to provide a motor-driven foldable type door mirror with no mutual interference between the reduction gear mechanism and clutch mechanism and having a larger reduction ratio.

The present invention has another object to provide a motor-driven foldable type door mirror in which it is possible to minimize the abrasion of both ends of the rotating shaft of the second-stage worm as well as the abrasion of the thrust bearing bearing the shaft ends.

The present invention has a still another object to provide a motor-driven foldable type door mirror in which the first-stage worm wheel or second-stage worm is not influenced by the thrust load developed at the counterpart, namely, the second-stage worm or first-stage worm wheel, while it is possible to prevent the speed-reduction efficiency of the reduction gear mechanism from being lowered due to the thrust load.

The present invention has a further object to provide a motor-driven foldable type door mirror which can be manufactured with a reduced quantity of necessary component parts and a reduced number of assembling processes.

DISCLOSURE OF THE INVENTION

The above object of the present invention can be attained by providing a motor-driven foldable type door mirror comprising, according to the present invention, a mirror base to be fixed to the body or door of a car; a shaft integrally formed on and extending from the mirror base; a mirror assembly pivotably supported on the shaft; a motor provided in the mirror assembly; a reduction gear mechanism composed of two stages of worm gears coupled with the motor; a gear concentrically fixed to the second-stage worm gear in the reduction gear mechanism; a clutch mechanism mounted on the shaft; a gear disposed at the clutch mechanism; and an idle gear interposed between the gear at the clutch mechanism and that at the reduction gear mechanism.

By disposing the idle gear between the gear at the reduction gear mechanism and that at the clutch mechanism, the reduction ratio can be further increased with no interference of the second-stage worm gear with the assembling of the clutch mechanism.

Also, in the motor-driven foldable type door mirror according to the present invention, since balls for thrust bearings are disposed between both ends of the rotating shaft of the second-stage worm of the reduction gear mechanism composed of the two stages of worm gears and the thrust gears which support both the ends of the rotating shaft of the second-stage worm, it is possible to minimize the abrasion, caused by the thrust load developed at the second-stage worm, of both the ends of the rotating shaft of the second-stage worm as well as of the thrust bearing bearing both the ends of the rotating shaft.

Further, in the motor-driven foldable type door mirror according to the present invention, since the support holding both ends of the rotating shaft of the second-stage worm is split, balls for thrust bearings can be interposed between the thrust bearings and both the ends of the rotating shaft of the second-stage worm.

Furthermore, in the motor-driven foldable type door mirror according to the present invention, since the first-stage worm wheel of the reduction gear mechanism composed of the two stages of worm gears and the second-stage worm are separate from each other and the first-stage worm wheel and the second-stage worm are mounted non-pivotably and axially movably, any thrust load developed at the first-stage worm wheel or at the second-stage worm has no influence on the counterpart, namely, the second-stage worm or the first-stage worm wheel and it is possible to prevent the speed-reduction efficiency of the reduction gear mechanism from being lowered due to the thrust load caused at the first-stage wheel or the second-stage worm.

Moreover, in the motor-driven foldable type door mirror according to the present invention, since one shaft screw fixes to the mirror assembly the member which holds the reduction gear mechanism composed of the two stages of worm gears, rotatably bears the holding member and mirror assembly and also supports the thrust load on the second-stage worm wheel by means of the holding member and mirror assembly, it is possible to reduce the number of component parts and the number of assembling processes.

BRIEF DESCRIPTION OF THE DRAWINGS

The accompanying drawings show together one embodiment of the motor-driven foldable type door mirror according to the present invention, in which.

BEST MODE FOR CARRYING OUT THE INVENTION

Figure 1:
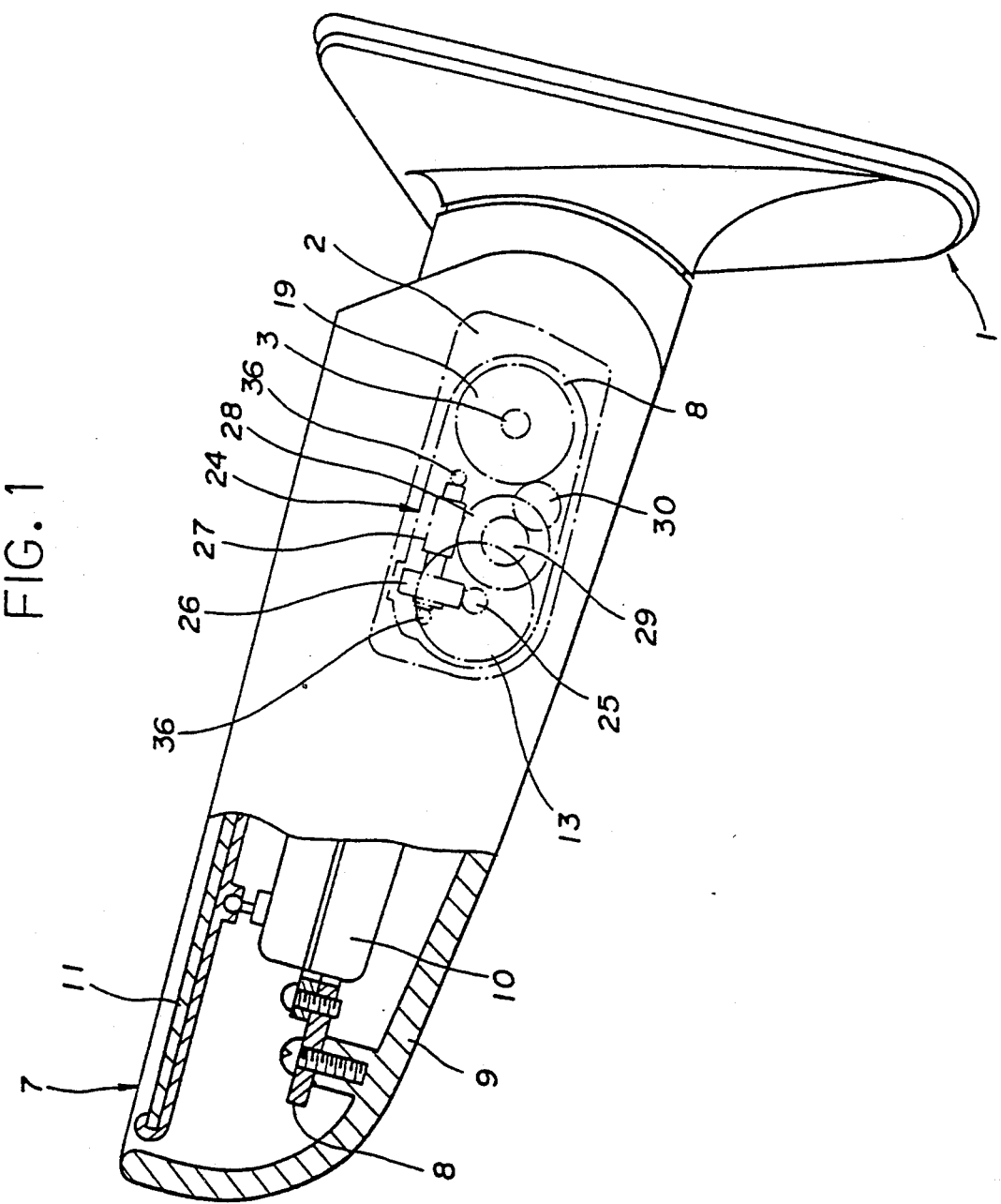
FIG. 1 is a partially fragmentary plan view of the door mirror of the present invention.
Figure 2:
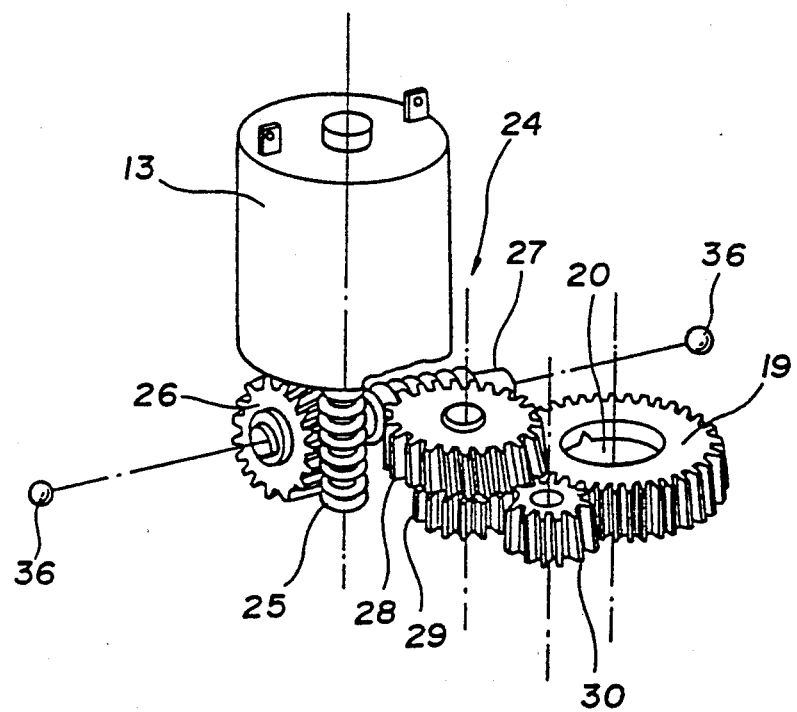
FIG. 2 is a perspective view of the reduction gear mechanism.
Figure 3:
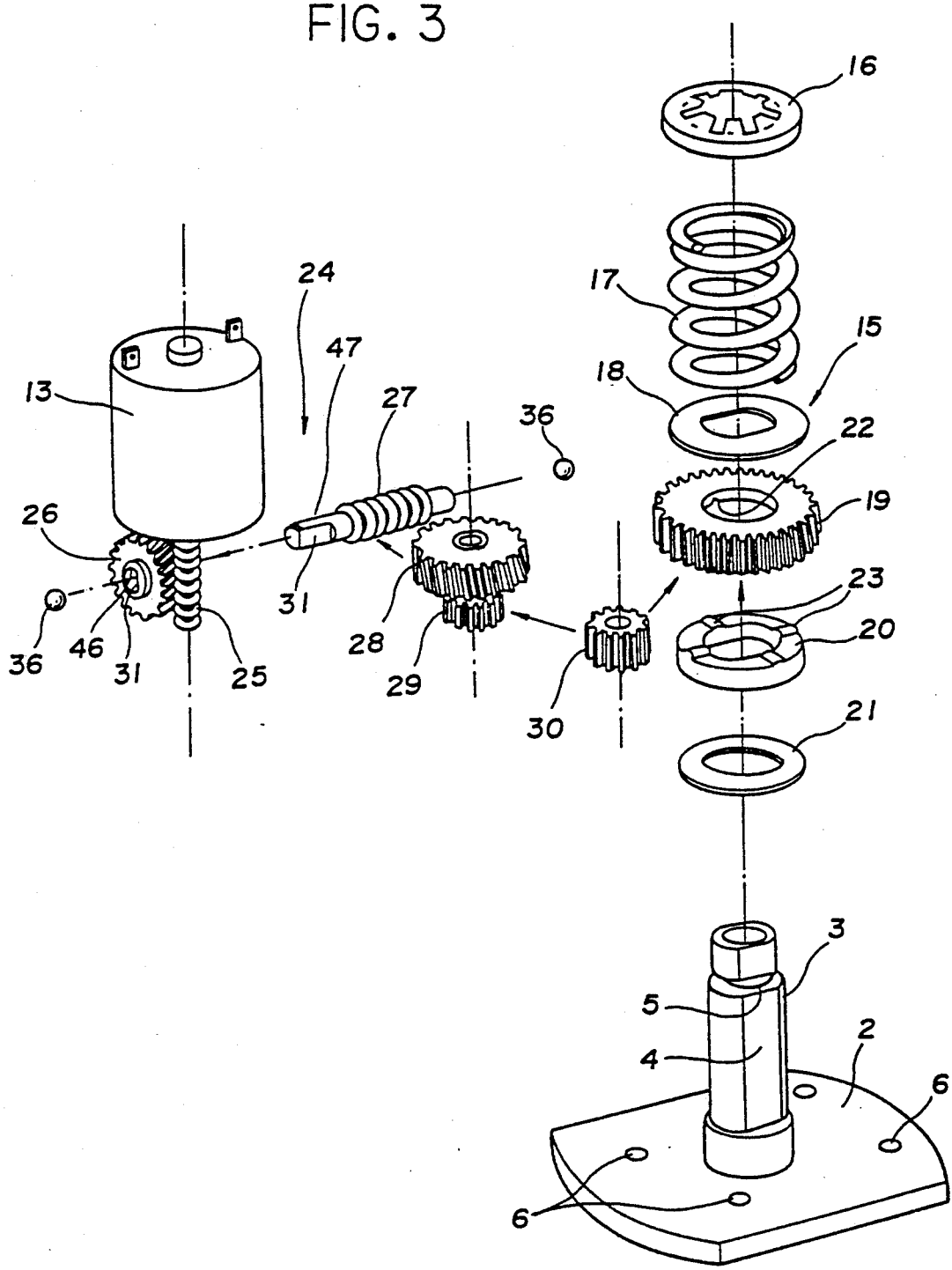
FIG. 3 is an exploded perspective view of the reduction gear and clutch mechanisms.
Figure 4:
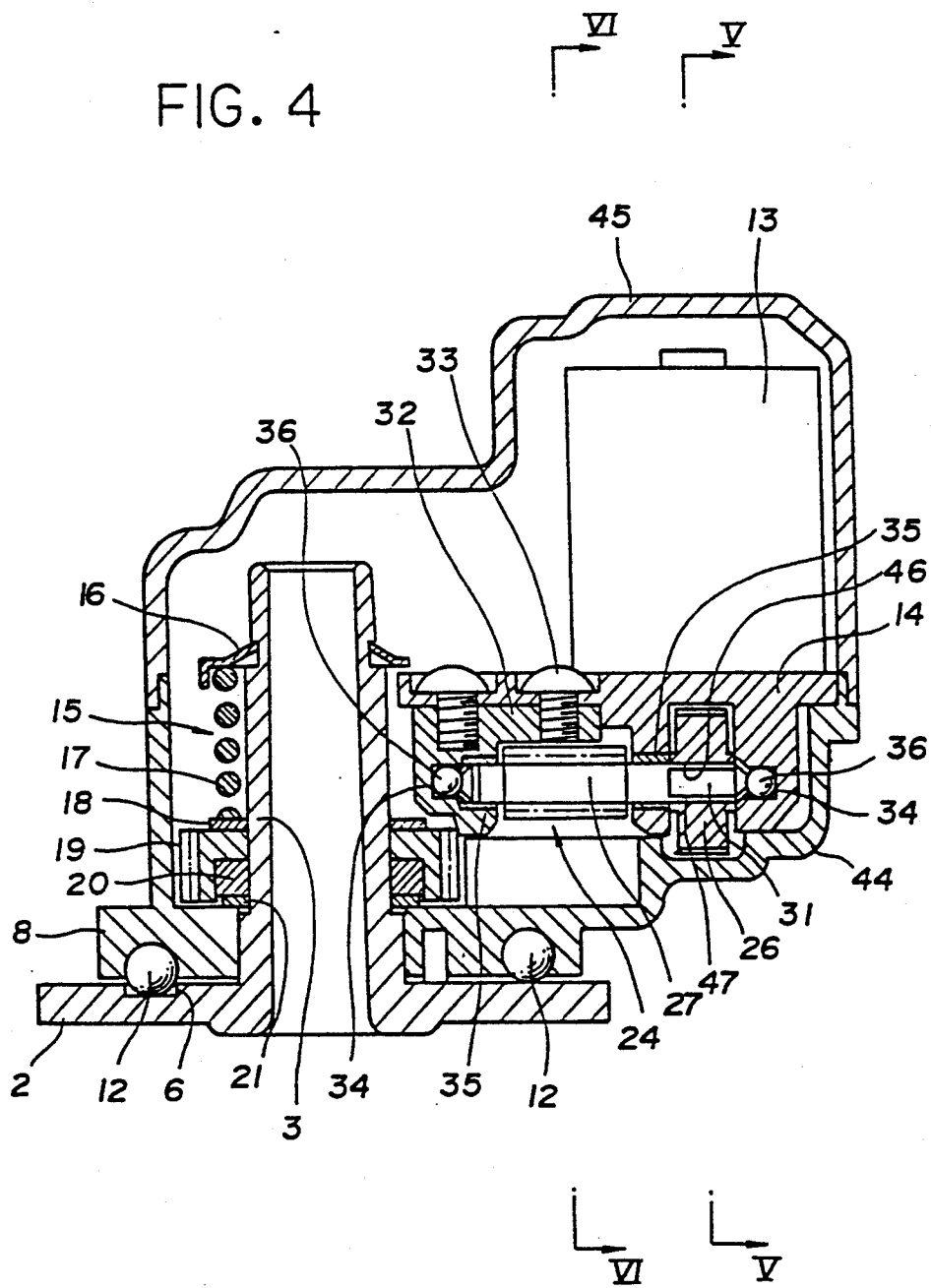
FIG. 4 is a sectional view showing the engagement between the reduction gear and clutch mechanisms.
Figure 5:
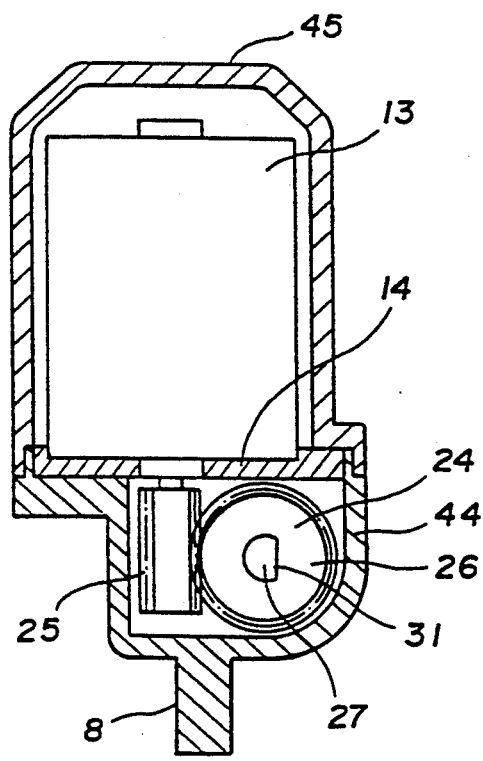
FIG. 5 is a sectional view taken along the line V—V in FIG. 4.
Figure 6:
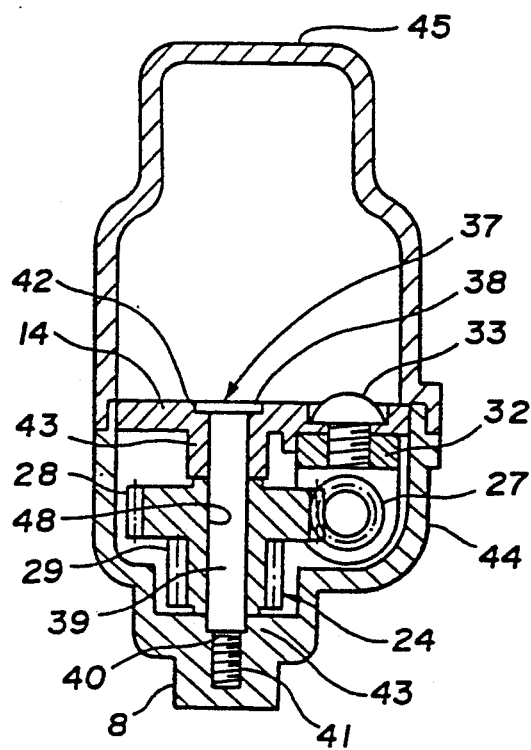
FIG. 6 is a sectional view taken along the line VI—VI in FIG. 4.

One embodiment of the reduction gear mechanism in the motor-driven foldable-type door mirror according to the present invention will be explained hereinbelow with reference to the drawings.

In Figures, the reference numeral 1 indicates a mirror base by which the mirror is fixed to the body of a car. The reference numeral 2 indicates a shaft holder on which a hollow shaft 3 is integrally formed, extending perpendicularly therefrom. The shaft holder 2 is fixed to the mirror base 1. The shaft 3 is chamfered at the reference numeral 4 against rotation, and has an engagement recess 5 provided circumferentially at the top end thereof. The shaft holder 2 has provided in the top face thereof concavities 6 in which balls 12 which will be described later are fitted, these concavities 6 being laid correspondingly to a normal position where the mirror is laterally projected from the car body and a folded position where the mirror is folded along the car body, respectively.

The reference numeral 7 indicates a mirror assembly comprising a unit bracket 8 pivotably supported on the shaft 3, a mirror housing 9 and power unit 10 fixed to the unit bracket 8, and a mirror 11 so installed to the power unit 10 that it can be turned vertically and horizontally and which is disposed in the front opening of the mirror housing 9.

Balls 12 are rotatably disposed at the bottom face of the unit bracket 8 at the positions opposite to the fitting concavities 6 in the mirror housing 9.

The reference numeral 13 indicates a motor built in the mirror assembly 7 and installed on a plate 14 fixed to the unit bracket 8.

The reference numeral 15 indicates a clutch mechanism mounted on the shaft 3 and which comprises a push nut 16, compression spring 17, washer 18, clutch gear 19 as input gear, clutch holder 20 and washer 21, as mounted on the shaft 3 sequentially from above.

The clutch gear 19 is a spur gear and rotatable in relation to the shaft 3, and has an engagement recess 22 formed in the bottom thereof. The clutch holder 20 is fixed to the shaft 3, and has engagement pawls 23 provided on the top face thereof. The push nut 16 is engaged in the engagement recess 5 in the shaft 3 and compresses the compression spring 17. Under the elasticity of the compression spring 17, the engagement pawls 23 on the top face of the clutch holder 20 are engaged in the engagement recess 22 in the bottom face of the clutch gear 19 so that the clutch gear 19 is coupled with the clutch holder 20. Also under the elasticity of the compression spring 17, the shaft holder 20 is forced upward by means of the shaft 3 so that the balls 12 on the unit bracket 8 are forced on the top face of the shaft holder 2.

The reference numeral 24 indicates a reduction gear mechanism disposed between the clutch mechanism 15 and the motor 13 and which comprises a first worm 25 fixed to the output shaft of the motor 13, a first helical gear 26, as first worm wheel, in mesh with the first worm 25, a second worm 27 having a rotating shaft 47 of which a D-cut portion is introduced axially movable but non-rotatably in a central through-hole 46 of the first helical gear 26, and a second helical gear 28, as second worm wheel, in mesh with the second worm 27.

An output gear 29 of the spur gear is fixed concentrically to the second helical gear 28, and an idle gear 30 of the spur gear is interposed between the output gear 29 and the clutch gear 19 as input gear. Namely, the idle gear 30 is in mesh with the output gear 29 and the clutch gear 19 as input gear, respectively.

The first worm 25 and first helical gear 26 as first worm wheel form together a first stage of worm gears, and the second worm 27 and second helical gear 28 as second worm wheel form a second stage of worm gears.

The reference numeral 32 indicates a support separate from the plate 14. This support 32 is fixed to the plate 14 with a binding screw 33 and further fixed to the unit bracket 8 by means of the plate 14. A concavity 34 for thrust bearing is formed, and also a radial bearing 35 are provided, in the plate 14 and support 32. Both ends (one end between the first helical gear 26 and the second worm 26, and other end) of the rotating shaft 47 of the second worm 27 is rotatably born by the radial bearing 35 in the plate 14 and support 32, and balls 36 for thrust bearing are interposed between the concavity 34 for thrust bearing in the plate 14 and support 32 and both the end faces of the rotating shaft 47 of the second worm 27.

The reference numeral 37 indicates a threaded shaft consisting of a head 38 at one end (top) thereof, a shaft portion 39 at the middle thereof, and a thread 40 at the other end (bottom) thereof. A screw hole 41 and head receiving concavity 42 are formed in the unit bracket 8 and plate 14, and there are provided an upper and lower bosses 43 between which the second helical- gear 28 and output gear 29 are held. The shaft portion 39 of the threaded shaft 37 is inserted in a central hole 48 in the second helical gear 28 and output gear 29, the thread 40 of the threaded shaft 37 is screwed into a screw hole 41 in the unit bracket 8, and the head 38 of the threaded shaft 37 is engaged in the head receiving concavity 42 in the plate 14. As the result, the second helical gear 28 and output gear 29 are rotatably born on the shaft portion 39 of the threaded shaft 37 and fixed axially (in the thrust direction) between the boss 43 of the unit bracket 8 and the boss 43 of the plate 14, respectively. The plate 14 and support 32 are fixed to the unit bracket 8.

The idle gear 30 is rotatably born on the unit bracket 8 by means of a rotating shaft (not shown). Also, the first worm 25 is rotatably born on the plate 14.

The reference numeral 44 indicates a gear case provided on the unit bracket 8, and 45 indicates a lid installed as fitted on the top opening of the gear case 44. The lid 45 and gear case 44 enclose together the shaft 3, motor 13, clutch mechanism 15, reduction gear mechanism 24, etc.

The motor-driven foldable type door mirror according to this embodiment is constructed as having been described in the foregoing. It is operated and functions as will be explained below:

First, the motor 13 is put into operation. The rotation of the motor 13 is transmitted to the idle gear 30 by means of the two stages of worm gears and output gear 29. Since the clutch gear 19 as input gear is coupled with the clutch holder 20, the clutch holder 20 is stationary. When receiving the rotation from the motor 13, the idle gear 30 rotates itself while going around the clutch gear 19. As the idle gear 30 goes around the clutch gear 19, the mirror assembly 7 is pivoted in relation to the mirror base 1 from the normal position to the folded position or vice versa. When the mirror assembly 7 is pivoted, the ball 12 at the mirror assembly 7 (unit bracket 8) is disengaged from the fitting concavity 6, and when the mirror assembly 7 is turned to the normal position or folded position, the ball 12 is fitted in the predetermined fitting concavity 6.

If anything hits the mirror assembly 7 in the normal position or when the mirror assembly 7 is manually pivoted by the driver while driving the car into the garage or out from there, the clutch gear 19 is uncoupled from the clutch holder 20 in the clutch mechanism 15 and the clutch gear 19 is rotated in relation to the shaft 3 while the mirror assembly 7 is pivoted from the normal position to the folded position or vice versa.

In the motor-driven foldable type door mirror according to the present invention, the reduction gear mechanism composed of the two stages of worm gears is more compact and larger in reduction ratio than the conventional ones composed of spur gears.

More particularly, in the motor-driven foldable type door mirror according to the present invention, the output gear 29 is disposed at the worm gears in two stages at the reduction gear mechanism 24 while the clutch gear 19 as input gear is disposed at the clutch mechanism 15, and an idle gear 30 is disposed between, and in mesh with, the output gear 29 and clutch gear 19. This arrangement provides a further large reduction ratio.

Since the idle gear 30 is interposed between the output gear 29 at the two stages of worm gears of the reduction gear mechanism 24 and the clutch gear 19, as input gear, of the clutch mechanism 15, the two stages of worm gears will not interfere with the assembling of the clutch mechanism 15. Namely, if the output gear 29 is put in direct mesh with the clutch gear 19 without using the idle gear 30, there will occur an interference between the second helical gear 28 of the reduction gear mechanism 24 and the clutch gear 19 of the clutch mechanism 15.

Assume that the torque of the motor 13 is, for example, 365 g·cm and the reduction ratio of the first-stage worm gears (25 and 26) is 33 while that of the second-stage worm gears (27 and 28) is 30. The thrust load developed at the first helical gear 26 will be about 50 kg while that at the second worm 27 will be about 140 kg.

In the motor-driven foldable-type door mirror according to the present invention, the ball 36 for thrust bearing is interposed between both ends of the rotating shaft 47 of the second worm 27 in the reduction gear mechanism 24 and the concavity 34 for thrust bearing in the plate 14 and support 32, bearing together, the ends of the shaft 47. Thus, even if a thrust load develops at the second worm 27, it is received by the ball 36. Thus, it is possible to reduce the abrasion of the bearing (at both ends of the rotating shaft 47 of the second worm 27 and at the concavity for thrust bearing in the plate 14 and support 32) due to the above-mentioned thrust load developed at the second worm 27.

Further, since the plate 14 and support 32, supporting together the second worm 27, are constructed separately from each other, the ball 36 for thrust bearing can be interposed between both ends of the rotating shaft 47 of the second worm 27 and the concavity 34 for thrust bearing in the plate 14 and support 34, supporting together the ends of the shaft 47.

Also, in the motor-driven foldable type door mirror according to the present invention, the first helical gear 26 is separate from the second worm 27 and the first helical gear 26 and second worm 27 are installed non-rotatably and axially movably (in the thrust direction). Thus, a thrust load developed at the first helical gear 26 or at the second worm 27 causes no influence on the counterpart, namely, the second worm 27 or first helical gear 26, so that it is possible to prevent the speed reduction efficiency of the reduction gear mechanism 24 from being lowered due to the thrust load.

Furthermore, in the motor-driven foldable door mirror according to the present invention, the shaft portion 39 of the threaded shaft 37 is inserted in the central through-hole 48 through the second helical gear 28 and output gear 29, the thread 40 of the threaded shaft 37 is screwed into the screw hole 41 in the unit bracket 8, the head 38 of the threaded shaft 37 is engaged into the head receiving concavity 42 in the plate 14. Thus the threaded shaft 37 serves as a rotating shaft for the second helical gear 28 and output gear 29, as a screw for fixing to the unit bracket 8 the plate 14 which supports the motor 13, first worm 25, first helical gear 26 and second worm 27, and as a member to connect the unit bracket 8 and plate 14 which support the thrust load developed at the second helical gear 28 and output gear 29. Thus, it is possible to reduce the quantity of component parts and the number of assembling processes.

In the above-mentioned embodiment, the first worm wheel 26 and second worm wheel 28 of the reduction gear mechanism 24 are a helical gear, but they may be a spur gear.

Also, in the above-mentioned embodiment, the clutch mechanism 15 is disposed at the shaft 3, but it may be disposed at the reduction gear mechanism.

What is claimed is:

1. An electrically-driven foldable door mirror, comprising:
    a mirror base to be fixed to the body or door of a car;
    a shaft integrally formed on and extending from said mirror base;
    a mirror assembly pivotably supported on said shaft;
    a motor provided in said mirror assembly;
    a reduction gear mechanism including first-stage and second-stage worm gears coupled with said motor;
    a gear concentrically fixed to the second-stage worm gears in said reduction gear mechanism;
    a clutch mechanism including a clutch holder fixed to said shaft, a clutch gear pivotably mounted on said shaft, and compression spring means mounted on said shaft for urging said clutch gear toward said clutch holder;
    an idle gear interposed between the clutch gear and the gear concentrically fixed to the second-stage worm gears.

2. An electrically-driven foldable door mirror according to claim 1, wherein the first-stage worm wheel of said reduction gear mechanism is separate from the second-stage worm, and the first-stage worm and the second-stage worm are mounted non-rotatably and axially movably.

3. An electrically-driven foldable door mirror according to claim 1; further comprising:
    a member for holding said reduction gear mechanism; and
    a threaded shaft for fixing said holding member to said mirror assembly, rotatably bearing the second-stage worm wheel of said reduction gear mechanism, and further supporting the thrust load developed at said second-stage worm by means of said holding member and mirror assembly.

4. An electrically-driven foldable door mirror according to claim 1, wherein the first-stage worm wheel of said reduction gear mechanism is separate from the second-stage worm, and the first-stage worm and the second-stage worm are mounted non-rotatably and axially movably.

5. An electrically-driven foldable door mirror, comprising:
- a mirror base to be fixed to the body or door of a car;
- a shaft integrally formed on and extending from said mirror base;
- a mirror assembly pivotably supported on said shaft;
- a motor provided in said mirror assembly;
- a reduction gear mechanism including first-stage and second-stage worm gears coupled with said motor;
- a clutch mechanism including a clutch holder fixed to said shaft, a clutch gear pivotably mounted on said shaft and coupled with said reduction gear mechanism, and compression spring means mounted on said shaft for urging said clutch gear toward said clutch holder;
- a thrust bearing supporting each end of a rotating shaft of the second-stage worm of said reduction gear mechanism; and
- a ball for each thrust bearing being interposed between said thrust bearing and each end of the rotating shaft of said second-stage worm.

6. An electrically-driven foldable door mirror according to claim 5, wherein a support for both the ends of the rotating shaft of said second stage worm is so split that the balls for the thrust bearings are interposed between said thrust bearings and both the ends of the rotating shaft of said second stage worm.

7. An electrically-driven foldable door mirror according to claim 5, further comprising:
- a member for holding said reduction gear mechanism; and
- a threaded shaft for fixing said holding member to said mirror assembly, rotatably bearing the second-stage worm wheel of said reduction gear mechanism, and further supporting the thrust load developed at said second-stage worm by means of said holding member and mirror assembly.

* * * * *